United States Patent [19]
Strauss

[11] 3,803,416
[45] Apr. 9, 1974

[54] SLOTTED COAXIAL GERMANIUM GAMMA-RAY CAMERA

[75] Inventor: Michael G. Strauss, Downers Grove, Ill.

[73] Assignee: The United States of America as represented by the United States Atomic Energy Commission, Washington, D.C.

[22] Filed: Nov. 28, 1972

[21] Appl. No.: 310,179

[52] U.S. Cl. .................................. 250/370, 250/371
[51] Int. Cl. .............................................. G01t 1/24
[58] Field of Search ............ 250/366, 367, 370, 371

[56] References Cited
UNITED STATES PATENTS

| | | | |
|---|---|---|---|
| 3,524,985 | 8/1970 | Sayres | 250/371 |
| 3,527,944 | 9/1970 | Kraner | 250/370 X |
| 3,621,256 | 11/1971 | Cacheux et al. | 250/370 |

Primary Examiner—Archie R. Borchelt
Attorney, Agent, or Firm—John A. Horan

[57] ABSTRACT

An image is obtained of a radiation emitting object using a coaxial germanium semiconductor detector which includes an N-type-semiconductor peripheral region axially separated into a plurality of N-type-semiconductor region segments, a P-type-semiconductor core region and an intrinsic semiconductor center region between the N-type-peripheral and P-type-core regions. A pinhole collimator surrounds the coaxial detector to collimate the radiation from the object to impinge on the surface of the detector in the axial direction of the detector. A bias voltage is applied between each N-type region segment and the P-type core region of the detector. A preamplifier, amplitude discriminator, and a signal encoder are serially connected to each of the N-type segments to measure output signals therefrom responsive to the incidence of the radiation on the detector and thereby provide a binary readout of the angular position of incidence of the radiation. A pulse-shape analyzer and analog-to-digital converter are serially connected to the P-type core of the detector to provide a binary readout of signals corresponding to the radial position of incidence of radiation on the detector. A computer associates and combines the polar radial and angular positional data of the radiation on the detector into Cartesian coordinate signals which are applied to an oscilloscope for an image display of the object.

10 Claims, 10 Drawing Figures

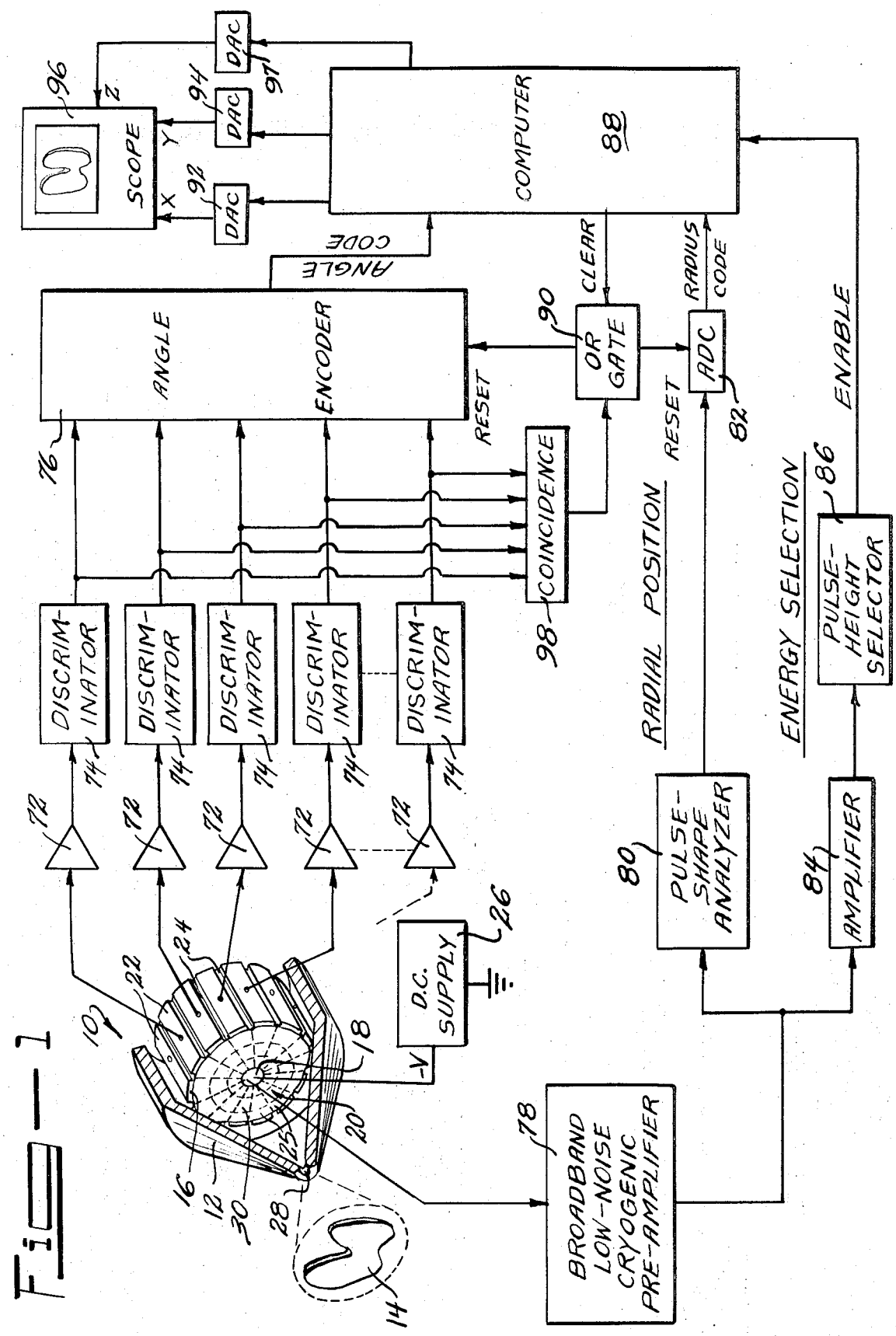

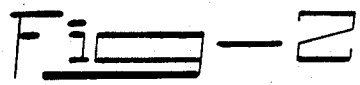
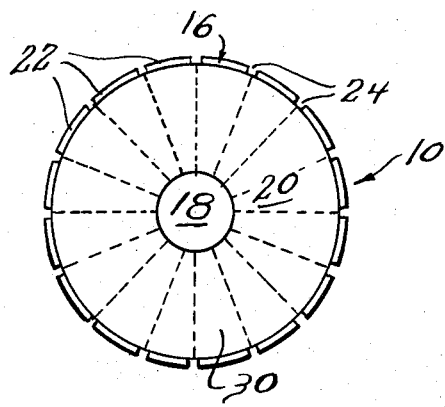
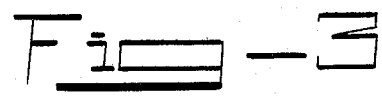
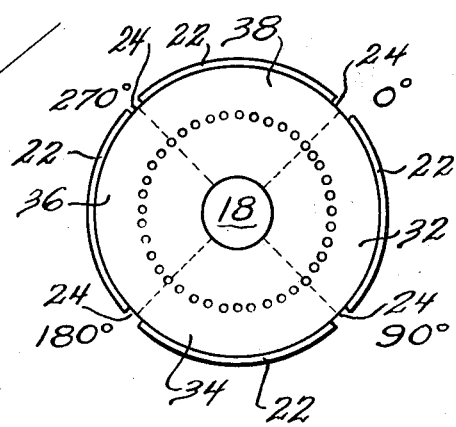
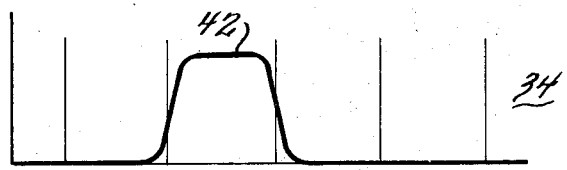
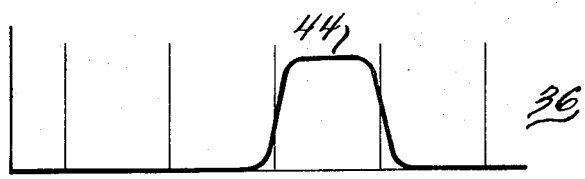
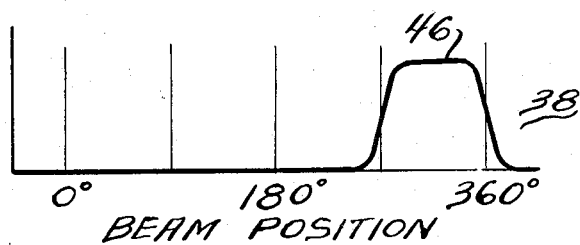

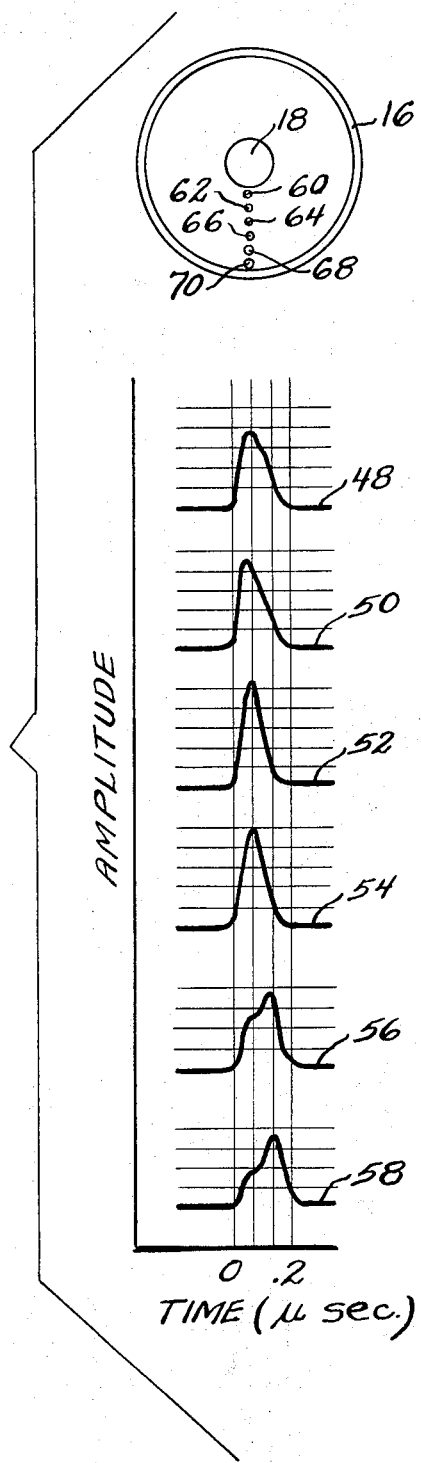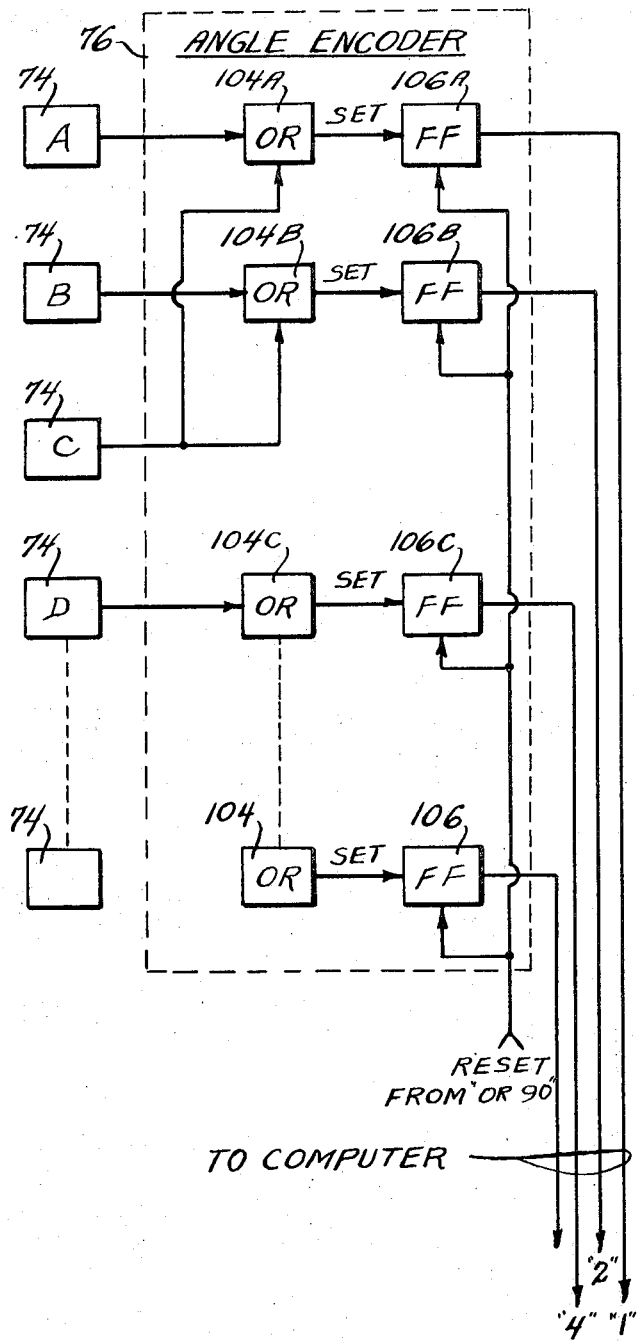

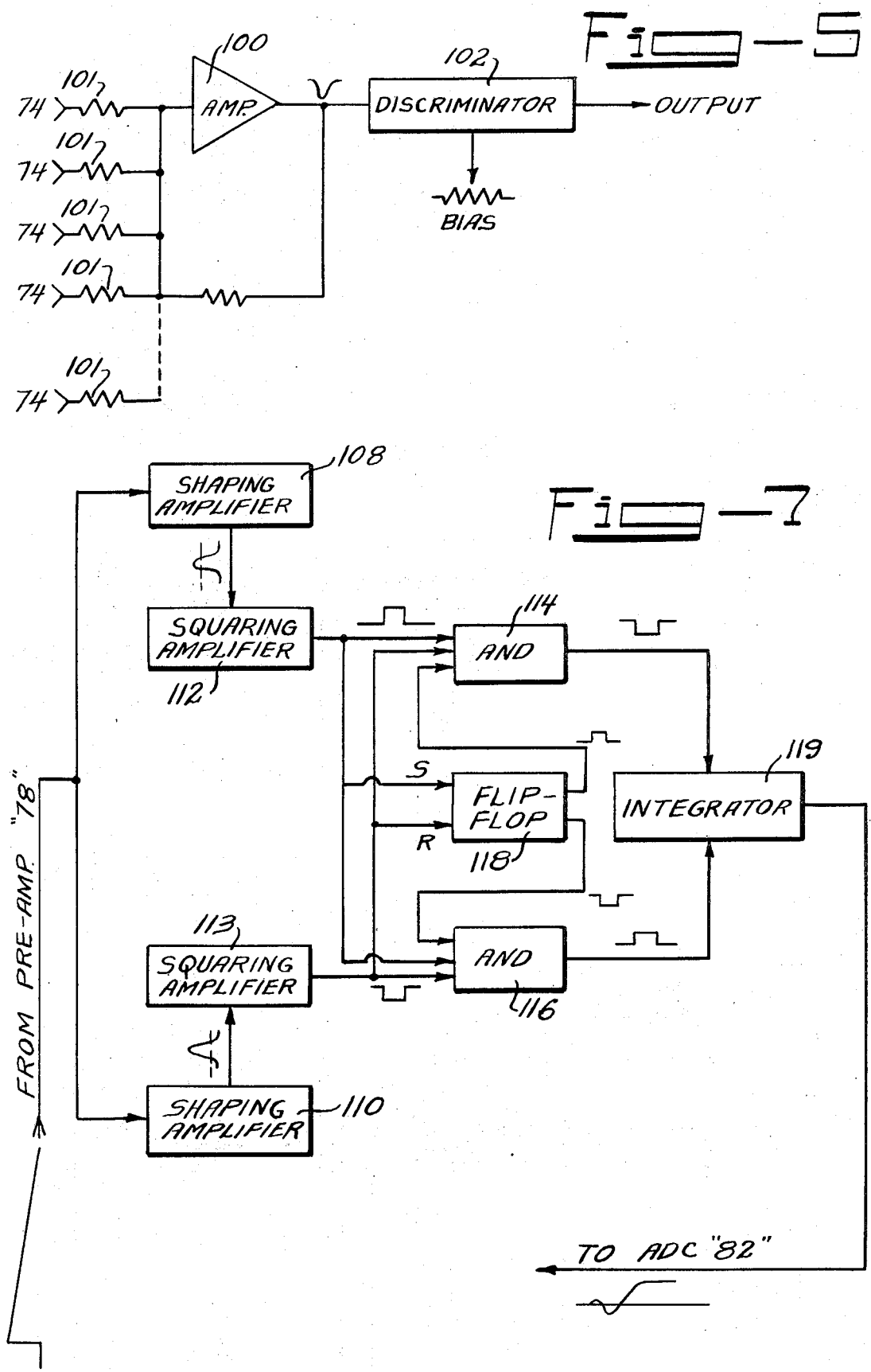

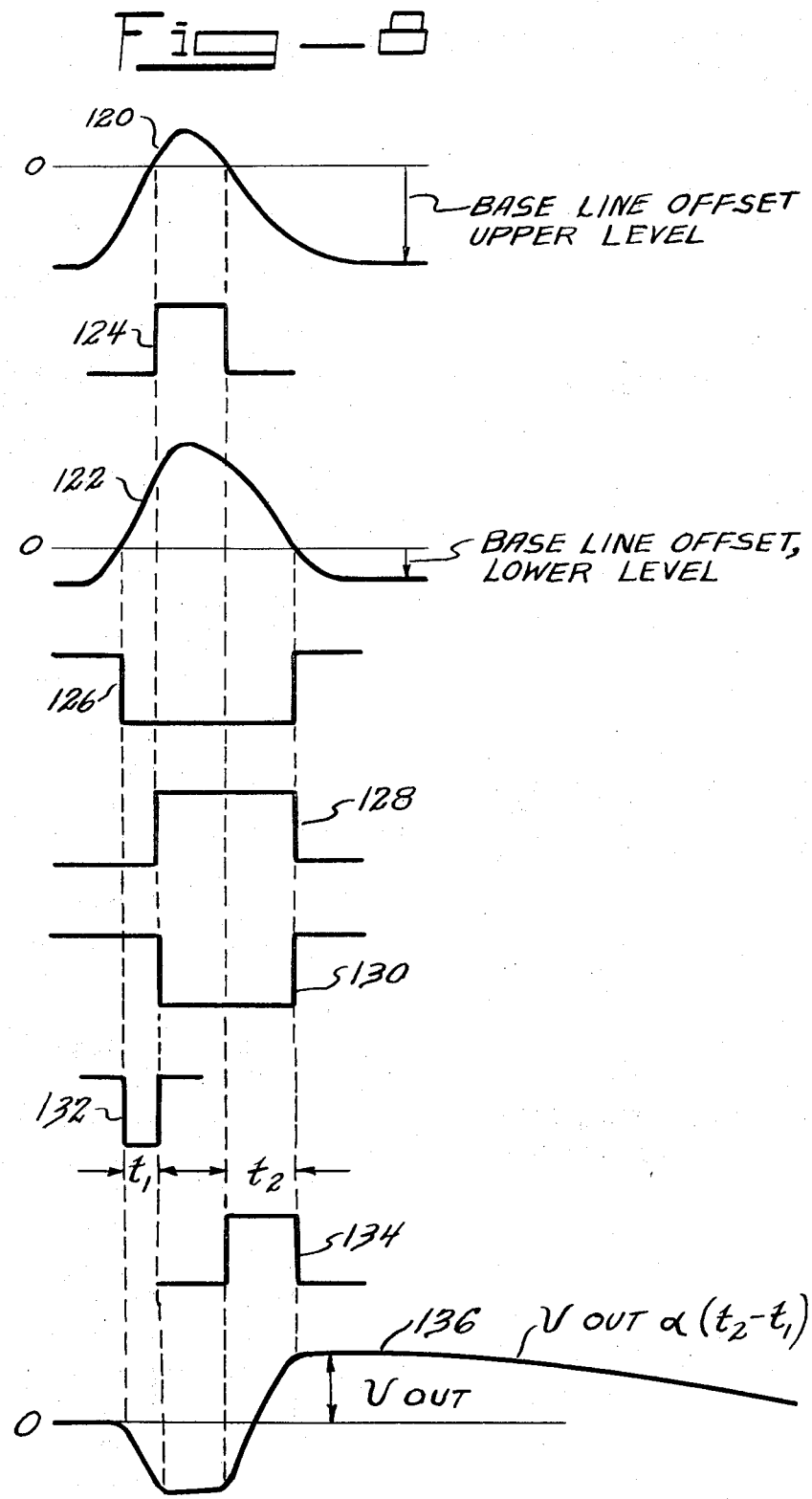

DATA ACQUISITION SUBROUTINE

POLAR DISPLAY SUBROUTINE

SLOTTED COAXIAL GERMANIUM GAMMA-RAY CAMERA

CONTRACTUAL ORIGIN OF THE INVENTION

The invention described herein was made in the course of, or under a contract with the United States Atomic Energy Commission.

BACKGROUND OF THE INVENTION

This invention relates to radiation imaging devices and more particularly to gamma-ray cameras.

Radioisotopes are widely used in the practice of medicine. When used with the gamma-ray camera, radioisotopes enable the imaging of organs *in vivo*. Presently available gamma-ray cameras are often of the Anger camera type, see H. O. Anger, Rev. Sci. Instr. 29 27 (1958), and utilize scintillator techniques with scintillating materials such as, NaI(T1). The NaI scintillator has limited energy resolution and attempts have been made to provide an improved gamma-ray camera utilizing high energy resolution materials, such as germanium. The main benefits in using germanium detectors for isotopic organ imaging are:

1. Rejection of gamma-rays that are even slightly degraded by scattering in intervening tissue, thus enhancing the contrast of the image. This enhancement is particularly significant when using a mono-energetic isotope, such as $^{99m}Tc$ for imaging "cold" lesions in deep-lying organs which do not move during respiration.

2. Improving the peak-to-background ratio of low energy peaks in the presence of higher energy lines. This feature assumes an important role when the low energy peak is contaminated by the underlying background produced by scatter from higher energy gamma rays emitting by another radionuclide or by the same one as in $^{67}Ga(92, 182, 296$ keV$)$.

3. Resolving closely spaced energy peaks due to different isotopes. This provides for imaging with multiple isotopes such as $^{75}Se(136$ keV$)$ and $^{99m}Tc(140$ keV$)$ or rejecting the fluorescent X-rays (73, 75, 85, 87 keV) emanating from the lead collimator when using low energy isotopes such as $^{67}Ga(92$ keV$)$.

A germanium gamma-ray camera has been disclosed by R. P. Parker, E. M. Gunnersen and J. L. Wankling in a paper entitled "A Semiconductor Gamma Camera with Quantitave Output," Medical Radioisotope Scintigraphy, Vol. 1, Vienna, IAEA, 1969, pages 71-85. This gamma-ray camera used planar germanium detectors. One disadvantage of all germanium cameras is that germanium produces a small signal requiring preamplification of the signal to a usable amplitude. Furthermore, high performance preamplification utilizing cryogenically cooled preamplifiers is desirable therefor. With the requirement of multiple preamplifiers and other electronic instruments evidenced in the planar detector, the cost and unreliability of such a camera becomes excessive. The state of the art is also such that planar germanium detectors greater than one inch square are extremely difficult and costly to make. Accordingly, it is one object of the present invention to provide an improved method and means for imaging a radiation emitting object.

It is another object of the present invention to provide a gamma-ray camera having a higher resolution and reliability of operation than heretofore.

It is another object of the present invention to provide a method and means having a relatively low cost and high energy resolution and high spatial resolution for imaging a gamma-ray radiation emitting object.

It is another object of the present invention to provide a high resolution gamma-ray camera utilizing coaxial germanium detectors.

It is another object of the present invention to provide a high resolution gamma-ray camera utilizing germanium detectors and having fewer components than heretofore.

Other objects of the present invention will become more apparent as the detailed description proceeds.

In general, the radiation imaging device of the present invention comprises a coaxial semiconductor detector including an N-type-semiconductor peripheral region axially separated into a plurality of N-type-semiconductor region segments, a P-type-semiconductor core region and an intrinsic-semiconductor center region between the N-type peripheral and P-type core regions. Means are provided for intercepting the radiation with the detector in the axial direction of the detector and for applying a potential between each of the N-type region segments and the P-type core region. Means are also provided coupled to each of the N-type semiconductor region segments and the P-type semiconductor core region to measure the respective output signals therefrom responsive to the incidence of the radiation on the detector and for combining such signals to provide an image of the radiation incident on the detector.

Further understanding of the present invention may best be obtained from consideration of the accompanying drawings wherein:

FIG. 1 is a schematic diagram of an apparatus for the practice of the present invention;

FIG. 2 is an enlarged representation of the coaxial detector of FIG. 1;

FIG. 3 is a graphical view of typical count rates obtained from the N-type peripheral segments of the coaxial detector of FIG. 2 when scanned with a gamma-ray beam;

FIG. 4 is a graphical view of typical current waveform outputs obtained from the P-type core of coaxial detector of FIG. 2;

FIG. 5 is a detailed schematic diagram of the coincidence circuit of FIG. 1;

FIG. 6 is a detailed schematic diagram of the angle encoder of FIG. 1;

FIG. 7 is a detailed schematic diagram of the pulse-shape analyzer of FIG. 1;

FIG. 8 is a graphical view of typical waveforms obtained with the elements of the pulse-shape analyzer of FIG. 7;

Figure 9:
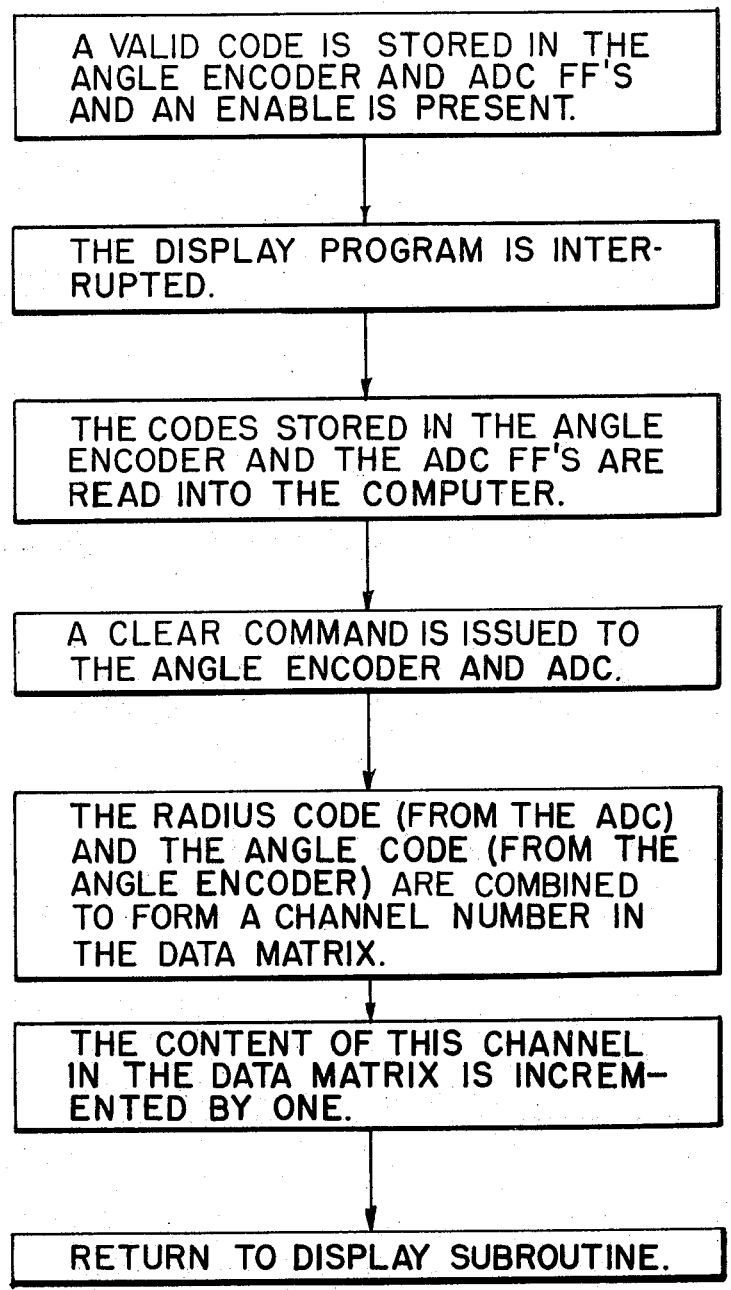
FIG. 9 is a flow diagram of the data acquisition subroutine of the computer of FIG. 1.

In FIG. 1, a coaxial semiconductor detector 10 is positioned within a pinhole gamma-ray collimator 12 relative a gamma-ray radiation emitting body 14 to axially receive gamma-ray radiation from the body 14.

The coaxial semiconductor 10 is of a material such as germanium or lithium-drifted germanium having a high-energy resolution for gamma-rays. As shown in FIGS. 1 and 2, the detector has an outer N-type semiconductor region 16, an inner P-type semiconductor core 18, and an intrinsic semiconductor region 20 between the N and P-type materials of regions 16 and 18.

It will be appreciated that for the practice of the present invention, the coaxial detector 10 may also be constructed so that it has an outer P-type semiconductor region 16, an inner N-type semiconductor core 18 and an intrinsic semiconductor region 20 therebetween. For purposes of illustration and description, region 16 will be described as N-type semiconductor material and core 18 as P-type semiconductor material.

For the practice of the present invention, the outer N-type semiconductor region 16 is axially separated into a plurality of N-type semiconductor segments 22 by axial slots 24 which cut through the N-type semiconductor region 16 down to the intrinsic semiconductor region 20. Thus, the detector 10 is effectively divided into a plurality of pie-shaped sectors 25, each having an N-type-semiconductor region segment 22 at its periphery, an intrinsic middle region 20 and the P-type-semiconductor core region 18.

A DC supply 26 is connected to the P-type core region 18 to provide a negative bias voltage thereto. The outer peripheral N-type region segments 22 are each maintained at relative ground potential. Thus, between each N-type region segment 22 and the inner P-type core region 18 a potential is established.

The pinhole collimator 12 and detector 10 are positioned relative the body 14 so that gamma rays from the body 14 pass through the aperture 28 of the collimator 12 and strike the face surface 30 of the detector in the axial direction of the detector. The pinhole aperture 28 in the collimator 12 is sized and spaced from the body 14 and the face surface 30 of the detector 10 to provide maximum spatial resolution and image size for gamma rays from the body 14 on the face surface of the detector 10.

With the detector 10 structured as hereinbefore described, impingement of gamma rays from the body 14 on the face surface 30 of detector 10 will cause an output signal to result from each of the N-type region segments 22 when the gamma rays impinge in the pie-shaped sector 25 defined by the N-type segment 22. It will thus be appreciated that with the impingement of gamma rays from the body 14 on the face surface 30 of the detector 10, the N-type segments 22 output signals will define the angular position of incidence of the gamma ray impinging on the face surface 30 of the detector 10. This may be more fully appreciated by reference to FIG. 3 wherein is shown typical outputs from a detector 10 having four slots 24 cut therein to provide four N-type-semiconductor region segments 22 defining four pie-shaped sectors 32, 34, 36 and 38. A one millimeter collimated gamma-ray beam parallel to the detector axis was scanned around the detector surface with beam positions one millimeter apart at a fixed radius from the center of the detector. The obtained angular response from such a scan is shown in FIG. 3 by the waveforms 40, 42, 44 and 46. The waveform 40 represents the output from the N-type segment of sector 32 as the gamma-ray beam passed through the sector. Similarly waveforms 42, 44 and 46 are for corresponding pie-shaped sectors 34, 36 and 38 as the beam passed therethrough. When the gamma-ray beam is on the boundary zone between two of the two pie-shaped sectors defined by their respective N-type segments both sectors are activated producing an output from each of the associated N-type segments. This is shown by the overlap in the waveforms 40, 42, 44 and 46.

It has been found that the radial incident position of the gamma-ray relative the face surface 30 of the detector 10 may be determined by examining the output signals from the P-type core region 18 of the coaxial detector. This will be further appreciated by considering FIG. 4 wherein is shown the output pulses obtained from the detector 10 as the collimated one millimeter gamma-ray was radially moved from the P-type core region 18 to the N-type outer region 16 of the detector.

The waveforms 48, 50, 52, 54, 56 and 58 correspond to the output signals from the P-type core region 18 as the collimated gamma-ray beam was moved outwardly from the core region 18 to the N-type outer region 16 through corresponding positions (2.5mm apart) 60, 62, 64, 66, 68 and 70.

It will be noted that each of the output waveforms are distinctly different at each of the positions shown. Thus, waveforms 56 and 58 have a slow rise with a shoulder on the leading edge of the pulse while waveforms 50 and 48 are slow to fall with a shoulder on the trailing edge of the pulse. Pulse 52 rises faster than the pulse 54 but both decay in equal times, a time governed by the response of the electronics used. Thus, the radial position from the P-type core 18 of the gamma-ray beam incident upon the surface 30 of the detector 10 may be determined by the waveform of the output pulse from the P-type core region 18.

It will be appreciated that the aforedescribed information obtained from the P-type core 18 and N-type segments 22 describes the positional incidence of gamma-rays on the face surface 30 of detector 10 in polar coordinates. Such polar coordinate information is utilized in the present invention to provide an image display of the object 14.

In FIG. 1 each of the N-type region segments 22 of detector 10 are connected to an associated preamplifier 72. Each preamplifier 72 has its output connected to an associated amplitude discriminator 74 (amplitude-sensitive Schmitt trigger). The amplitude sensitivity of each discriminator 74 is set to exclude background noise and therefore to accept only signals from the associated preamplifiers 72 which are generated by gamma-rays incident on the face surface 30 of the detector 10. The outputs from the discriminators 74 are fed to an angle encoder 76 wherefrom a binary coded output is generated for each input thereto. The structure of the encoder 76 will be described in more detail later, it being presently sufficient for the understanding of the present invention that the encoder 76 accepts the output from the particular discriminator 74 and generates therefor a binary code signal identified with the particular N-type segment 22 from which the signal originates.

A broadband low-noise cryogenic preamplifier 78 has its input connected to the P-type core region 18 of detector 10. The output from the preamplifier 78 is fed to the input of a pulse-shape analyzer 80. Pulse-shape analyzer 80 operates to generate an output signal whose amplitude corresponds to the shape of the applied input pulse. Thus, analyzer 80 transforms the unique pulse-shape outputs from the P-type core 18 into pulses having an amplitude corresponding to the radial displacement from the core 18 of the gamma-rays incident upon the face surface 30 of the detector 10. The output from pulse analyzer 80 is fed to the input of an analog-to-digital converter 82 wherein the amplitude of the applied input pulse is converted to a digital signal. Thus, the output from the analog-to-digital converter 82 is a digital signal which is representative of the radial displacement from the core 18 of a gamma-ray incident upon the face surface 30 of the detector 10.

The output from preamplifier 78 is also amplified by an amplifier 84 and fed into the input of a pulse-height selector 86. The pulse-height selector is set so that it passes pulses representative of the particular energy of the gamma-rays incident on the surface of the detector 10. Thus, the pulse-height selector rejects extraneous background. The pulse-height selector 86 has its output connected to the "enable" of a general purpose computer 88, such as a Honeywell DDP–116. The outputs from the angle encoder 76 and the analog-to-digital converter 82 are read into the memory bank of the computer 88 responsive to the presence of the enable signal from pulse-height selector 86. After each reading, the computer provides a clear signal which is fed to an OR gate 90 to reset the angle encoder 76 and the analog-to-digital converter 82. The computer 88 is programmed to accept and store the digital coded angle and radial information from the encoder 76 and analog-to-digital converter 82. Further, the computer operates on the polar coordinate information contained in this information to extract therefrom by conventional arithmetical means the Cartesian coordinate equivalent thereof.

Upon a read command, the computer 88 provides the desired Cartesian-coordinate readout information to digital-to-analog converters 92 and 94 which are respectively connected to the X and Y sweeps of an oscilloscope 96. The frequency storage in the computer memory for the particular Cartesian coordinate is fed through a digital-to-analog converter 97 to modulate the Z intensity of the oscilloscope display. Thus, for a particular polar coordinate in the face surface 30 of the detector 10 the corresponding X and Y Cartesian coordinate will be displayed on the oscilloscope 96 with an intensity modulation thereof proportional to the number of gamma rays incident on the surface of the detector 10 at that polar coordinate point.

As previously stated, gamma-rays may be incident on the face surface 30 of the detector 10 so that the gamma-rays fall at the common boundary of the sectors 25 defined by the N-type peripheral segments 22, wherefrom an ambiguous count would be obtained and displayed on the oscilloscope 96. To prevent this ambiguous readout and display, a coincidence circuit 98 is connected to each of the outputs from discriminators 74 whereby the coincidence circuit 98 provides an output whenever two or more of the N-type segments 22 have a simultaneous output signal therefrom. The output from coincidence circuit 98 is fed to the OR gate 90 to reset the angle encoder 76 and analog-to-digital converter 82 whereby the event information for that occurrence is not entered into the computer 88. A detailed schematic of the coincidence circuit 98 is shown in FIG. 5. The coincidence circuit 98 comprises an operational amplifier 100 whose input is connected through a plurality of resistors 101 to the outputs of the respective discriminators 74. The output of the operational amplifier 100 is connected to the input of an amplitude-sensitive discriminator 102. The operational amplifier 100 sums the amplitudes of the signals simultaneously received from discriminator 74 and the bias of the discriminator 102 is adjusted so that the discriminator 102 triggers only on input signals which are equal to or greater than twice the normal output signal from a single discriminator 74. Thus, discriminator 102 provides an output signal whenever two or more signals are simultaneously received from the discriminators 74.

The angle encoder 76 of FIG. 1 is shown in more detail in FIG. 6. The encoder 76 comprises a plurality of conventional OR gates 104 and conventional flip-flop circuits 106. The OR gates 104 and flip-flops 106 are interconnected in conventional binary sequence so that outputs are generated from the angle encoder 76 which are in binary representative form for the particular input signal received from an associated discriminator 74. This is illustrated in FIG. 7 for N discriminator 74 inputs. For example, when a single input is received from sector discriminator 74A, the OR gate 104A will set the flip-flop 106A to provide a binary one count output; when an input is received from sector discriminator 74B, OR gate 104B will set flip-flop 106B to provide binary two count output; when an input is received from sector discriminator 74C, OR gates 104A and B will set flip-flop circuits 106A and B to provide a binary three count output. When an input is received from discriminator 74D, OR gate 104C will set flip-flop 106C to provide a binary four count output for encoder 76. This binary sequence interconnection of OR and flip-flop circuits 104 and 106 is effected so that for each of the N-type segments 22 of the detector 10 a corresponding binary output is obtained therefor from the angle encoder 76. The output from OR gate 90 responsive to either coincidence of outputs from the N-type segments 22 or from a clear command from the computer 88 is fed as shown to the reset of the flip-flop circuits 106 to effect a clearing thereof so that no signal is transmitted from the encoder 76 into the memory bank of the computer 88.

The pulse-shape analyzer 80 hereinbefore described is shown in more detail in FIG. 7. The output pulse from the broadband low noise cryogenic preamplifier 78 is fed to the input of two like shaping amplifiers 108 and 110. The output from the shaping amplifier 108 is fed through squaring amplifier 112 to the input of AND circuits 114 and 116 and to the set input of a flip-flop circuit 118. The output from squaring amplifier 113 is fed to the second inputs of AND circuits 114 and 116 and to the reset input of the flip-flop circuit 118. The two outputs of flip-flop 118 are fed to the third inputs of ANd circuits 114 and 116. The outputs of AND circuits 114 and 116 are connected to the input of an integrator 119. The output of integrator 119 is fed into the input of the analog-to-digital converter 82.

Operation of the pulse-shape analyzer 80 may be further appreciated by referring to FIG. 8 wherein is illustrated with respect to time the particular waveforms for the elements of the pulse-shape analyzer 80. The pulse-shape analyzer 80 accepts the long-trailing-edge output pulse from the preamplifier 78 to the inputs of shaping amplifiers 108 and 110. Shaping amplifiers 108 and 110 each operate to differentiate the input pulse to restore the pulse to the current waveform output from P-type core 18 and to establish therefor a variable offset baseline. The shaping amplifier 108 establishes a higher baseline offset for its output than that of shaping amplifier 110. Typical waveform outputs for each amplifier 108 and 110 are shown in waveforms 120 and 122 in FIG. 8, respectively. It is to be noted that waveform 120 has a higher baseline offset than that of waveform 122. Further, it will be appreciated that the different waveform output signals from P-type core 18, as illustrated in FIG. 4, will give different waveform outputs from amplifiers 108 and 110 than illustrated in FIG. 8.

The signal outputs from shaping amplifiers 108 and 110 are respectively fed to the input of squaring amplifiers 112 and 113 which act to convert the input signal to a square-shaped output signal. The output of squaring amplifier 112 is illustrated in waveform 124 and is a rectangular pulse having a time duration equal to the time duration that input signal 120 is greater than the zero baseline. The output from amplifier 113 is a square negative-polarity pulse 126 having a time duration equal to the time duration that input signal 122 is above the zero baseline. As stated, the output from squaring amplifier 112 is fed to the set input of flip-flop circuit 118 and the output of squaring amplifier 113 is fed to the reset input of flip-flop circuit 118. The flip-flop circuit 118, responsive to the positive going leading edge of waveform 124 from squaring amplifier 112, generates a positive and negative polarity waveform output as represented by waveforms 128 and 130, respectively. Responsive to the positive going trailing edge of waveform 126 from squaring amplifier 113, the reset of flip-flop circuit 118 terminates the waveforms 128 and 130. Thus, flip-flop circuit 118 provides positive and negative polarity outputs having a time duration extending from the leading edge of waveform 124 from squaring amplifier 112 to the trailing edge of waveform 126 from squaring amplifier 113. AND circuit 114 produces a negative polarity output pulse only during the time interval when waveforms 124, 126 and 128 are negative. An output waveform 132 is thus obtained from AND circuit 114 having a time duration $t_1$, which time duration is equal to the time period where all waveforms 124, 126 and 128 are negative in polarity. Similarly, AND circuit 116 produces an output pulse 134 only for the duration when waveforms 124, 126 and 130 are negative in polarity. This results in an output waveform 134 from AND circuit 116 having a time duration $t_2$, which time duration is equal to the time period that waveforms 124, 126 and 130 are negative in polarity. The two output pulse waveforms 132 and 134 from AND circuits 114 and 116, respectively, are additively combined (output 132 providing a negative charge input and output 134 a positive charge input) and integrated in integrator 119 to provide an output waveform 136 having a voltage which is corresponding to the input waveshape from the P-type core 18 of the detector 10. That is, pulses from the P-type core 18 of detector 10 having a fast rise time and slow fall time will produce an output waveform 136 having a large amplitude, pulses having a slow rise time and fast fall time will produce an output waveform 136 having a small amplitude, and pulses having a slow rise time and a slow fall time will produce an output waveform 136 having an amplitude somewhere therebetween. Thus, for each of the typical waveforms 48 through 58 illustrated in FIG. 4, unique output-voltage amplitudes will be obtained from integrator 119. That is, the output from integrator 119 will have a waveform which monotonically changes in amplitude for each of the waveforms 48 through 58.

Figure 10:
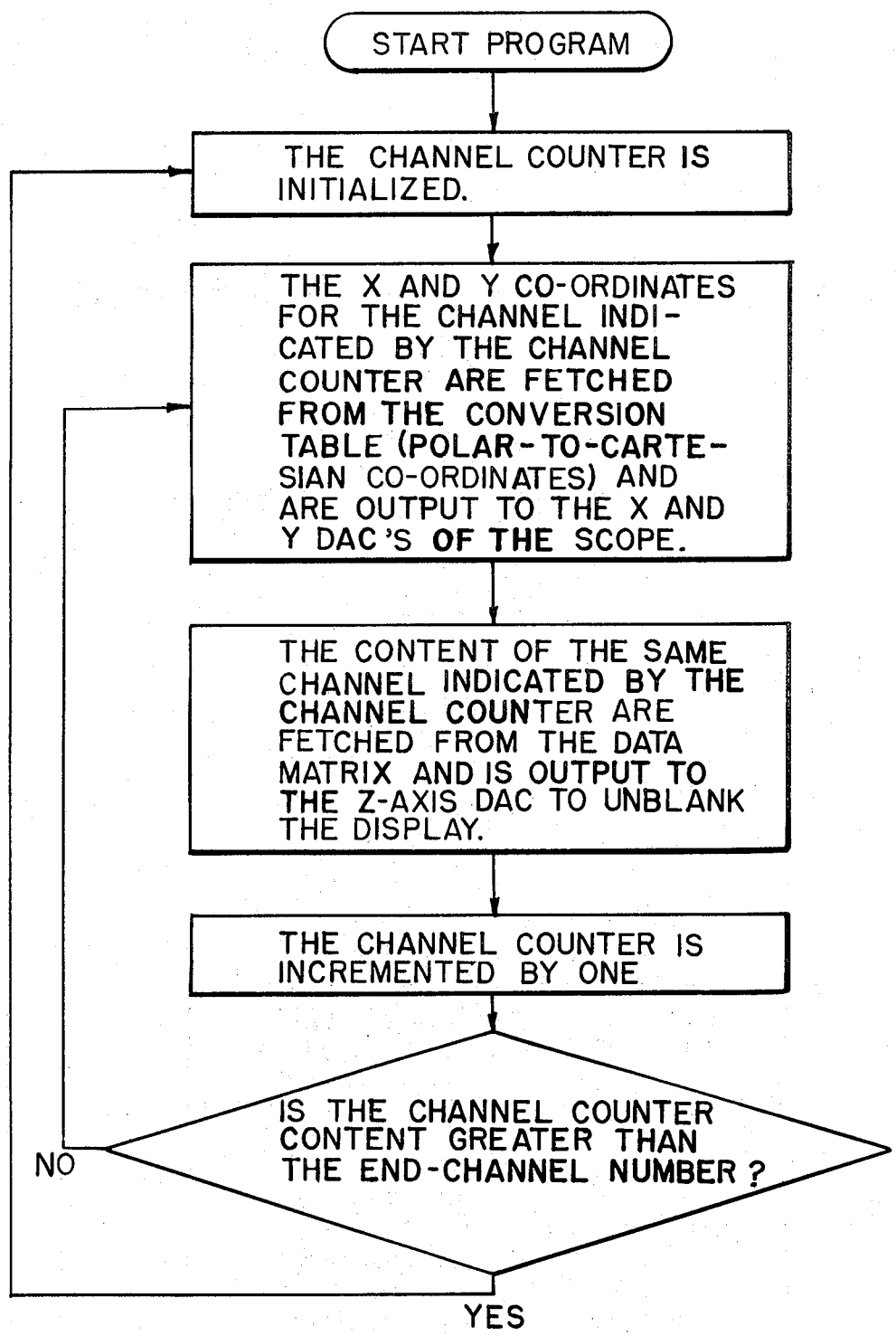
FIG. 10 is a flow diagram of the display subroutine of the computer of FIG. 1.

As previously stated, gamma-ray radial displacement digital information from analog-to-digital converter 82 and the gamma-ray angular displacement information from angular encoder 76 is fed to the memory core of the computer 88 for storage and conversion from polar coordinates to Cartesian coordinates and subsequent readout by oscilloscope 96. To further appreciate the function of the computer 88, the data acquisition subroutines and display subroutines therefor are shown in FIGS. 9 and 10, respectively. The computer 88 is normally in the display routine. When valid angular displacement data is present in the angle encoder 76 and valid radial displacement data is present in the analog-to-digital converter 82, together with an enable signal from pulse-height selector 86, the display program of the computer is interrupted. The angular and radial digital data from encoder 76 and analog-to-digital converter 82 are then read into the computer. A clear command is issued by the computer to the angle encoder 76 and analog-to-digital computer 82 via the OR circuit 90. The radial data information from the analog-to-digital converter 82 and the angular data information from the encoder 76 are then combined by the computer to form a channel number in the data matrix of the core memory of the computer. The content of this channel in the data matrix is then incremented by one thereby preparing for acceptance of the next data information input. The computer then returns to its display subroutine. A standard arithmetical polar to Cartesian coordinate conversion table is stored in the memory of computer 88 and to implement the display subroutine, the channel counter of the computer is initialized and the memory of the computer provides Cartesian X and Y coordinates for the particular channel being read out indicated by the channel counter. This X and Y coordinate information is then fed out to the X and Y digital-to-analog converters 92 and 94 and presented on the oscilloscope 96 display. The count in the same channel indicated by the channel counter is retrieved by the computer from the data matrix and is fed via the digital-to-analog converter 97 to the Z axis of the oscilloscope to unblank the display of the oscilloscope. The channel counter of the computer is then incremented by one. If the channel counter content is greater at this time than the end-channel number, the computer recycles to the start of the display subroutine. If it is not, then the computer reads out the next channel in the channel counter for display on the oscilloscope 96. Thus, a display of the object 14 is effected by the oscilloscope 96.

With the apparatus of the present invention constructed as hereinbefore described, a high spatial resolution and high energy resolution gamma-ray camera is effected. A coaxial detector having an outside diameter of approximately 5 centimeters, a core diameter of 0.6 centimeter and thickness of two centimeters has a sensitive area of approximately 19 square centimeters and core area of 0.3 square centimeter. While this detector has a relatively large area, approximately 20 square centimeters, it has a low capacity of approximately 10 picofarads. With only one high performance preamplifier being required therefor, the preamplifier 78 may thus easily be operated at cryogenic temperatures. Further, such a preamplifier may be built to exhibit extreme reliability. The combination of the low capacity of the detector with a low noise preamplifier 78 yields a high energy resolution for the camera. Further, the coaxial detector 10 minimizes the number of duplicate components required. As illustrated, the present invention requires only one high performance preamplifier 78 and N low cost sector preamplifiers (N being the number of sectors into which the detector 10 is divided) and no more than one pulse-height selector 86 per gamma-ray peak used. The large area coaxial detector 10 of the present invention is more economical and more readily available than present planar detectors and forms with the apparatus of FIG. 1 a gamma-ray camera which is highly reliable, relatively low cost and has high spatial resolution and high energy resolution.

While the aforedescribed preferred embodiment utilized a Cartesian coordinate display, it is to be appreciated that the present invention may be also accomplished using a polar display with a PPI oscilloscope. Where a polar display is utilized, Cartesian coordinate conversion of the polar data by the computer is not required. The radial and angular sweeps of the PPI oscilloscope are synchronized with the channel interrogation of the computer and the count in the data matrix modulates the oscilloscope display intensity to provide an image of the object.

Persons skilled in the art will of course readily adapt the teachings of the present invention to methods and means far different than those illustrated and described above. Accordingly, the scope of the present invention should be limited only in accordance with the appended claims.

The embodiments of the invention in which an exclusive property or privilege is claimed are defined as follows:

1. A device for imaging a radiation-emitting object comprising means for collimating the radiation from said object in a predetermined direction; a coaxial radiation-detector disposed to intercept said collimated radiation on a face surface thereof normal to the axis of said detector, said coaxial detector comprising an inner-core region of semiconductor material selected from one of the group consisting of N-type and P-type semiconductor material, an intrinsic semiconductor middle region, and an outer peripheral region of semiconductor material selected from the other of the said group consisting of N-type and P-type semiconductor material, said outer peripheral region being axially slotted along the length of said detector to form a plurality of outer peripheral semiconductor region segments each defining a pie-shaped sector at said face surface of said detector; means for measuring the incidence of said radiation on each of said pie-shaped sectors and the radial displacement of said incident radiation in each of said pie-shaped sectors; and means for displaying said measured incident radiation to provide an image of said object.

2. The apparatus according to claim 1 wherein said incident radiation measurement means comprise means for applying a potential between each of said outer peripheral semiconductor region segments and said semiconductor inner-core region, means coupled to each of said outer peripheral semiconductor segments to record output signals therefrom responsive to radiation incident on the particular pie-shaped sector associated with said segment, and means coupled to said inner-core region for measuring radial displacement of said radiation in each of said pie-shaped sectors.

3. The apparatus according to claim 1 wherein said incident radiation measurement and display means comprise means for applying a potential between each of said outer peripheral semiconductor segments and said semiconductor inner-core region, means coupled to each of said outer peripheral semiconductor segments for generating for each radiation incident on a pie-shaped sector of said detector face surface a first signal representative of the angular positional location of said pie-shaped sector in said face surface, means coupled to said inner-core region for generating a second output signal proportional to the time interval that the leading edge amplitude of an output signal from said inner-core region responsive to radiation incident on said detector is within a predetermined incremental value and for generating a third output signal proportional to the time interval that the trailing edge amplitude of an output signal from said inner-core region responsive to radiation incident on said detector is within said predetermined incremental value, means for combining and integrating said second and third output signals to provide a fourth output signal representative in amplitude to the radial displacement of said incident radiation in said pie-shaped sector, and means for associatively combining said outer peripheral segment first signal and said fourth output signal for each incident radiation on a pie-shaped sector to provide an image display of said object.

4. The apparatus according to claim 1 wherein said incident radiation measurement and display means comprise means for applying a potential between each of said outer peripheral semiconductor segments and said semiconductor inner-core region, means coupled to each of said outer peripheral semiconductor segments for generating for each incident radiation on the associated pie-shaped sector of said detector face surface a digital first signal identifying the associated pie-shaped sector, means coupled to said semiconductor inner-core region for generating second and third like signals having a waveform corresponding to an output signal from said inner-core region responsive to radiation incident on said detector, said second signal having a baseline offset different from the baseline offset of said third signal, means for generating a fourth signal having a time duration proportional to the relative time interval between zero crossings of the leading edges of said second and third signals, means for generating a fifth signal having a time duration proportional to the relative time interval between zero crossings of the trailing edges of said second and third signals, means for integrally combining said fourth and fifth signals to provide a sixth signal, the amplitude of said sixth signal being representative of the radial displacement of said incident radiation in the associated pie-shaped sector, means for generating a digital seventh signal representative of the amplitude value of said sixth signal, and means for associatively combining said first and seventh signals to provide an image display of said object.

5. The apparatus according to claim 4 further including means coupled to said semiconductor inner-core region for generating an eighth signal responsive to said incident radiation having a predetermined particular energy, and wherein said associative signal combining means associatively combines said first and seventh signals responsive only to said eighth signal to provide an image display of said object.

6. The apparatus according to claim 5 wherein said digital first signal generating means comprise filter means coupled to each of said outer peripheral semiconductor segments for transmitting only signals generated from said outer peripheral semiconductor segments responsive to radiation incident on the associated pie-shaped sector of said detector face, coincidence means for generating a ninth signal responsive to simultaneous radiation-incident signal generation by at least two of said outer peripheral semiconductor segments, and means coupled to said filter means and said coincidence means for generating in the absence of said ninth signal said digital first signal identifying the radiation-incident-responsive outer peripheral semiconductor segment and associated pie-shaped sector of said detector face.

7. A radiation imaging device comprising a coaxial-semiconductor radiation detector mounted to intercept said radiation in the axial direction of said detector on a face surface thereof substantially normal to said axial direction; said radiation detector comprising an outer peripheral layer of material selected from one of the group consisting of N-type and P-type semiconductor material, an inner core of material selected from the other of said group consisting of N-type and P-type semiconductor material, a semiconductor intrinsic region therebetween, and divided to provide at said face surface a plurality of pie-shaped sectors electrically isolated from each other, means for measuring incident radiation on each of said pie-shaped sectors of said face surface, means for measuring the radial position of incident radiation in each of said pie-shaped sectors of said face surface, and means for associatively displaying said measured incident radiation and the radial position thereof to provide an image of said radiation.

8. A method for imaging a radiation emitting object comprising collimating said radiation; mounting a coaxial radiation detector including an outer peripheral layer of semiconductor material selected from one of the class of material consisting of N-type and P-type semiconductor material, an inner core of semiconductor material selected from the other of said class of material consisting of N-type and P-type semiconductor material, and an intrinsic semiconductor region therebetween, to subject the face surface of said detector which is normal to the longitudinal axis thereof to said collimated radiation; dividing said coaxial radiation detector to provide at said face surface thereof a plurality of pie-shaped sectors electrically isolated from each other; measuring each radiation incident on each of said pie-shaped sectors and the radial displacement of each incident radiation in said pie-shaped sectors; and means for associatively combining said measured incident radiation to provide an image display of said object.

9. The method according to claim 8 wherein dividing said detector face surface into pie-shaped sectors comprises slotting said outer peripheral semiconductor layer to the depth of said intrinsic semiconductor region along the axial length of said detector to provide a plurality of outer peripheral semiconductor segments each defining the outer surface of a pie-shaped sector.

10. The method according to claim 9 wherein said incident radiation measurement and display comprises applying a potential between each of said outer peripheral semiconductor segments and said semiconductor inner-core, measuring the output signals from each of the outer peripheral semiconductor segments responsive to incident radiation on said face-surface pie-shaped detectors, measuring the output signals from said semiconductor inner-core responsive to incident radiation on said face-surface pie-shaped detectors, and associatively combining said measured outer peripheral semiconductor segment signals and said measured semiconductor inner-core signals to provide an image display of said object.

* * * * *